Sept. 30, 1924.
V. J. ODHNER
CALCULATING MACHINE
Filed May 2, 1922      4 Sheets-Sheet 1
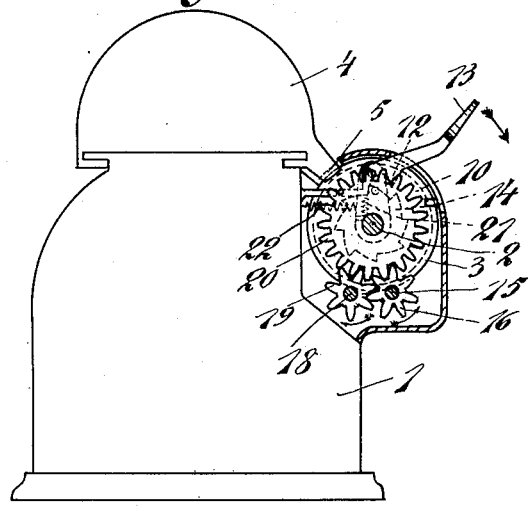
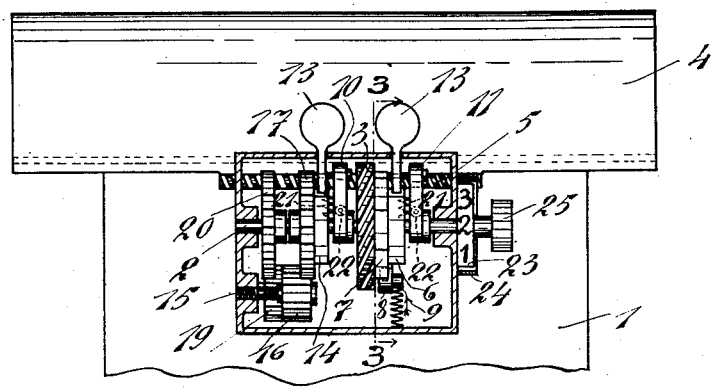
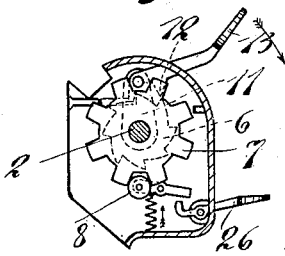
Inventor
V. J. Odhner,
By Marks&Clerk
Attys Sept. 30, 1924.

V. J. ODHNER 1,510,099

CALCULATING MACHINE

Filed May 2, 1922

Inventor
V. J. Odhner,
By Marks Clerk
Attys.

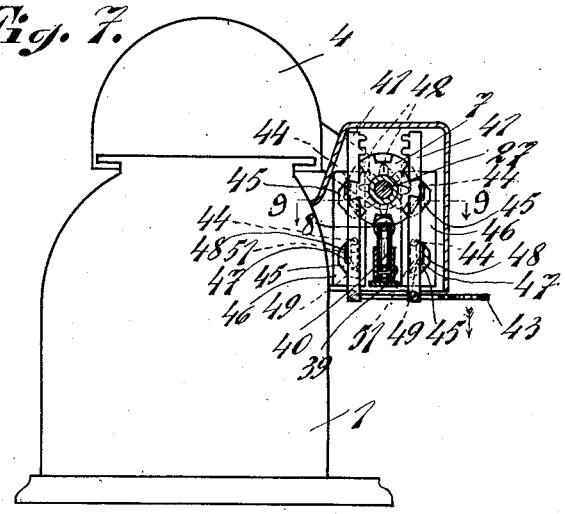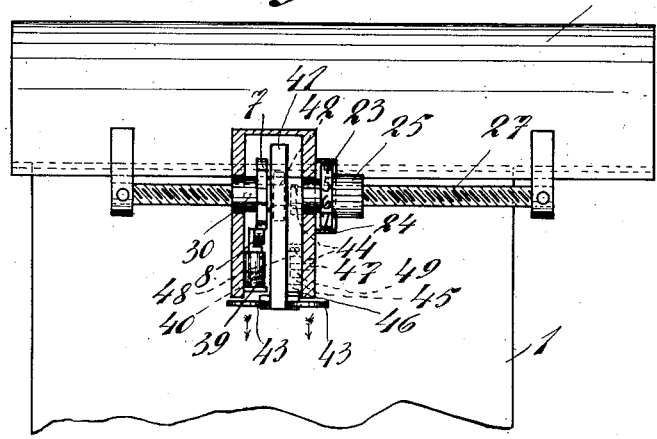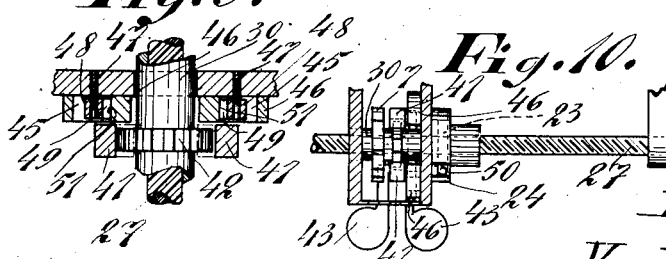

Sept. 30, 1924.

V. J. ODHNER 1,510,099

CALCULATING MACHINE

Filed May 2, 1922          4 Sheets-Sheet 4

Inventor
V. J. Odhner
Attys.

Patented Sept. 30, 1924.

1,510,099

UNITED STATES PATENT OFFICE.

VALENTIN JAKOB ODHNER, OF STOCKHOLM, SWEDEN.

CALCULATING MACHINE.

Application filed May 2, 1922. Serial No. 557,864.

*To all whom it may concern:*

Be it known that I, VALENTIN JAKOB ODHNER, a subject of the King of Sweden, and resident of Vikingagatan 30, Stockholm, in the Kingdom of Sweden, have invented certain new and useful Improvements in Calculating Machines, of which the following is a specification, reference being had therein to the accompanying drawings.

In calculating machines provided with a slidable carriage which supports the indicating discs etc., it is necessary when multiplying or dividing respectively with units of a higher ordinal number to set the carriage step by step to the right or the left to an extent corresponding to the ordinal number, dependent on if the figure in question has a higher or lower ordinal number. Means already known for moving the carriage step by step have however proved to function less reliably, as it often occurs when the carriage is quickly set, that the latter passes the intended position. Besides that, known means for setting the carriage usually make a noise during the work. The present invention refers to a means for setting the slidable carriage, by means of which said disadvantages are avoided.

In the accompanying drawing are shown by way of examples some embodiments of the device according to the present invention. Fig. 1 is an end-view of a calculating machine according to the present invention and Fig. 2 is a front-view of the machine. Fig. 3 is a section on the line 3—3 in Fig. 2. Fig. 4 is an end-view of a calculating machine according to another embodiment of the device and Fig. 5 shows the machine viewed from the front. Fig. 6 is a section on a larger scale on the line 6—6 in Fig. 5. Fig. 7 shows an end-view of a calculating machine according to a third embodiment of the device and Fig. 8 shows the machine, viewed from the front. Fig. 9 is a partial section on a larger scale on the line 9—9 in Fig. 7. Fig. 10 is a plan-view of the device for setting the carriage.

Figure 4:
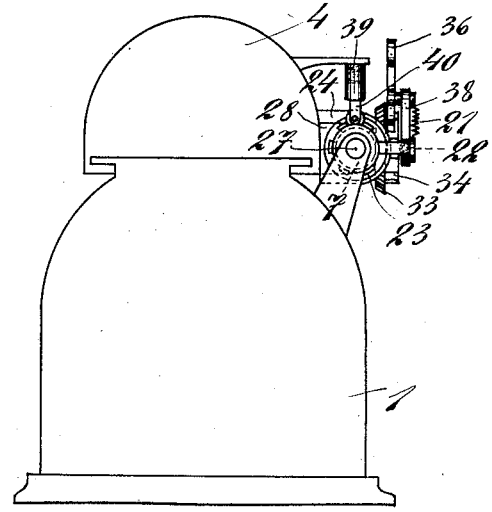

According to the embodiment shown in Figs. 1–3 a worm-wheel 3 is rigidly mounted on a shaft 2 which is rotatably mounted in the framework of the machine said worm-wheel engaging a correspondingly threaded member 5 on the carriage 4. A toothed feeder-wheel 6 and a toothed wheel 7 working in both directions and cooperating with a locking member, are fastened to the worm-wheel. In this embodiment said locking member comprises a roll 8 which is rotatably mounted on a double-armed, turnable and spring tensioned lever 9 in such a way that it can be moved towards and away from the toothed wheel 7. Two levers 10, 11 are also turnably mounted on the shaft 2, on each one of which a key 13 provided with a feeder-tooth 12 is turnably mounted, one of said keys being adapted to be operated at a movement of the carriage 4 to the right and the other at a movement to the left. One of the keys is so arranged as to cooperate with the feeder-wheel 6 and the other with another feeder-wheel 14 mounted on the shaft 2 and rotatable in the same direction as the former.

According to this embodiment the feeder-wheel 14 cooperates with a mechanism for reversing the direction of movement of the shaft 2. Said mechanism conveniently comprises a gear-wheel 16 rotatably mounted on a shaft 15 fastened in the framework, said gear-wheel engaging a gear-wheel 17 fastened to the feeder-wheel 14 and a gear-wheel 19 rotatably mounted on another stationary shaft 18. The latter gear-wheel engages in its turn a gear-wheel 20 fixedly mounted on the shaft 2 of the feeder-wheel.

When the key 13 located at the right is pressed down against the action of a spring 21 (Figs. 1 and 2) the tooth 12 on the key engages the feeder-wheel 6, whereupon the lever 11 participates in the continued movement of the key against the action of a spring 22. When the feeder-wheel 6 the worm-wheel 3 and the toothed wheel 7 are turned against the action of the locking mechanism 8, 9 the carriage 4 is moved to the right. The movement of the lever 11 and thus also of the key downwards is limited by means of a stop or the like which is so located, that the turning of the feeder-wheel 6 and the worm-wheel corresponds to the movement of the carriage one step, whereupon the roll 8 which at the beginning of the turning is moved outwards engages the next space between the teeth and again locks the worm-wheel 3. The key and the lever will thereupon return to their original positions while being acted upon by respective springs 21 and 22. When the key located at the left is pressed down it engages and turns the feeder-wheel 14 at which the gear-wheel 20 and the shaft 2 are turned in the opposite direction through the gear-wheels 17, 16, 19, so that the carriage 4 is moved one step to the left.

In order that the carriage when necessary may be freely moved any length in the one or the other direction the following arrangement is made. The shaft 2 is provided with or is by means of a gearing connected with a disc 23 participating in the movements of the shaft which is provided with figures or the like adapted to indicate the position of the carriage. The disc 23 is wholly or partly enclosed by a casing 24 which is provided with an opening (indicated by dotted lines in Fig. 2) in which the figures will be seen one after the other. The shaft 2 is furthermore provided with a knurled disc 25 or the like, by means of which the shaft can be turned without aid of the keys. The locking roll 8 is thereby brought out of engagement with the toothed wheel 7, for example by means of a turnable keylever 26 cooperating with the lever 9. As seen from the drawing the tooth 12 on the key 13 is located in inactive position outside the periphery of the feeder-wheels 6 and 14 respectively, so that the wheel can be turned in the one or the other direction without being hindered by said tooth.

Figure 5:
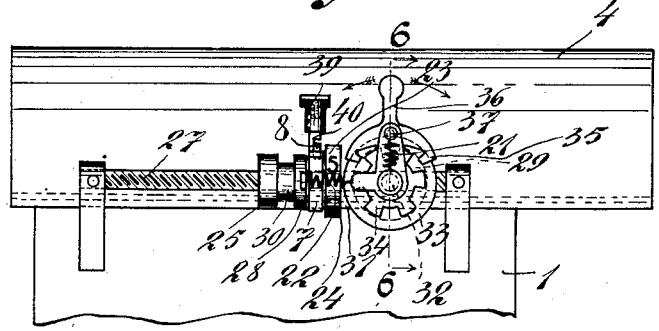
Figure 6:
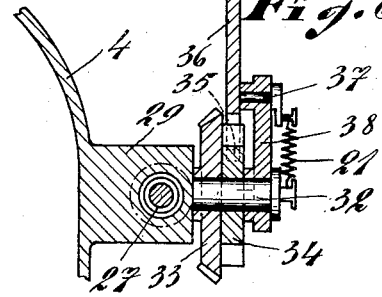

According to the embodiment shown in Figs. 4–6 the framework 1 is provided with a longitudinal screw 27, cooperating with a nut 30 turnably mounted in arms 28, 29 projecting from the carriage 4, said nut being provided with an indicating disc 23 and a knurled disc 25 enclosed by a sleeve or casing 24. The nut 30 is partly formed as a toothed wheel 7 acting in both directions and partly as a bevel gear-wheel 31, Fig. 5, which engages a bevel gear wheel 33 turnably mounted on a shaft 32 extending from the carriage. The shaft 32 which is located substantially perpendicular to the screw 27 in this case extends from the arm 29. The gear-wheel 33 is fastened to a feeder-wheel 34 acting in both directions, said feeder-wheel being adapted to be turned step by step in the one or the other direction by means of a key 36 provided with two feeder-teeth 35. The key 36 is by means of a pin 37 or the like turnably mounted in a lever 38 turnably mounted on the shaft 32, said lever as also the key being acted upon by springs which always tend to return them to the inactive position shown in the drawing. A roll 8 which is turnably mounted on a spring tensioned pin 40 mounted in a guide 39 cooperates with the toothed wheel or ratchet wheel 7. As in the first described embodiment the roll 8 cooperates with a keylever which in this case is not shown by means of which the roll can be brought out of engagement with the toothed wheel.

When the key 36 is turned to the right the tooth 35 engages the feeder-wheel 34 whereupon the lever 38 participates in the continued movement to the right, at which the wheel 34 and the gear-wheel 33 are turned in the same direction. By means of the gear-wheel 31 engaging the gear-wheel 33 the nut 30 together with the indicating disc 23 and the toothed wheel 7 are turned, so that the carriage 4 is moved one step to the right. The movement of the lever is limited by means of stops or the like not shown in the drawing. When the key being turned to the left in the same way engages and turns the feeder-wheel 34 and thus the gear-wheel 33 in the same direction the nut 30 is also turned through the gear-wheel 31 and the carriage is moved one step to the left. The movement of the carriage any length in the one or the other direction is carried out in the same way as according to the first described embodiment.

According to the embodiment shown in Figs. 7–10 the carriage 4 is provided with a longitudinal screw 27 which cooperates with a nut 30 turnably mounted in the framework 1 or in a housing at the side of the latter. Said nut is formed as a toothed wheel 7 working in both directions and as a gear-wheel 42 cooperating with two slidable racks 41. The racks 41 of which one is adapted to be operated for a movement of the carriage to the right and the other for a movement to the left are located on opposite sides of the wheel 42 and each one is provided with a key 43 located substantially perpendicular to the rack. Each one of the racks 41 is provided with two lateral pins 44 each one of which is entered into a recess 45 in a portion 46 which is substantially parallel with the rack. A double armed lever 48, 49 is by means of a pin 47 turnably mounted in each one of the recesses 45, said lever being acted upon by a spring, not shown in the drawing. As shown in Fig. 7 the racks 41 are so arranged that in their inactive position they do not prevent the turning of the gear-wheel 42. The nut 30 is provided with a knurled disc 25 and an indicating disc 23, the latter being provided with a sleeve 24 with an opening 50.

Figure 11:
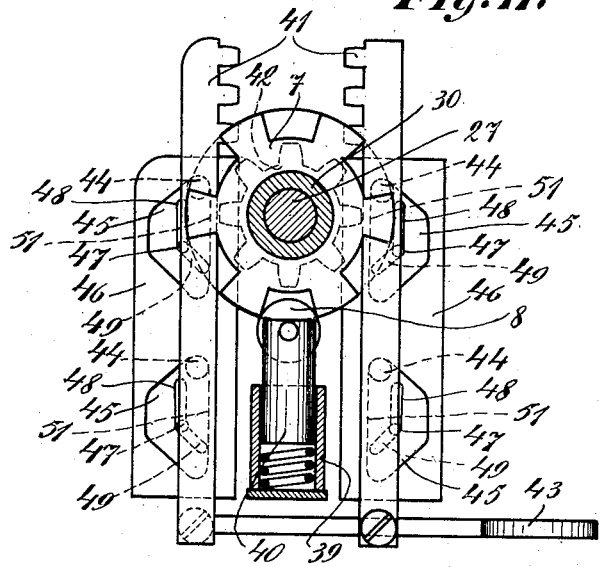
Fig. 11 is an enlarged end view, partly in section, of the main portion of the embodiment shown in Figs. 7 to 10 inclusive.
Figure 12:
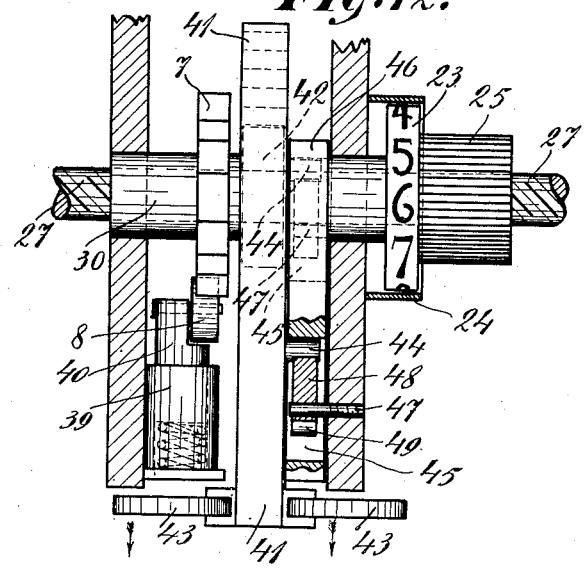
Fig. 12 is an enlarged side view, partly in section, of the same.

When either of the keys 43 is pressed down against the action of a spring, not shown in the drawing the corresponding rack 41 engages the gear-wheel 42 and turns the latter, at which the carriage 4 is moved one step to the right or the left depending upon whether the key located to the right or the left is operated upon (see Figs. 11 and 12). Each one of the pins 44 thereby obtains a rectilinear path of movement between the edge 51 of the recess and the lever 48. When the pin 44 has passed the pin 47 the other lever arm 49 is moved sidewards against the action of a spring on the pin 47 to a position substantially parallel with the edge 51 of the recess. When the pin 44 has passed the arm 49 the latter under the action of the spring will again occupy the original position shown in the drawing, so that the rack at its returning movement is forced to follow a path of movement along the opposite side of the lever. Said path is located at a distance from the first path of movement which is larger than the engagement of the teeth between the rack 41 and the gear-wheel 42. The movement of the carriage any length in the one or the other direction is effected in the same way as in the other embodiments.

The shown and described embodiments can evidently be varied in several respects without departing from the idea of the invention.

Having now described my invention, what I claim as new and desire to secure by Letters Patent is:

1. In a calculating machine, means for setting the slidable carriage which supports the indicating discs and etc., including a member mounted on the frame work and a member mounted on the carriage, said members cooperating with each other and one being provided with threads and the other with projections engaging said threads, one of said members being turnable, cooperating with feeder mechanism and having its axis substantially parallel with the direction of movement of the carriage, and a locking mechanism cooperating with the turnable member and adapted to lock said member in positions corresponding to the working positions of the carriage.

2. In a calculating machine, means for setting the slidable carriage which supports the indicating discs and etc., including a worm wheel, a shaft turnably mounted in the frame work and fixed to the worm wheel, a threaded member engaging the worm wheel and mounted on the carriage, a toothed feeder wheel and a second toothed wheel fixed to the worm wheel, a locking member pivotally mounted on said shaft, a key pivotally connected to each lever, one of said keys being arranged to engage the teeth of said feeder wheel, a second feeder wheel mounted on the shaft, the other one of the keys engaging the second feeder wheel, both feeder wheels being rotatable in the same direction, and means for reversing the direction of movement of the shaft, connected to the second feeder wheel.

3. In a calculating machine, means for setting the slidable carriage which supports the indicating discs and etc., including a shaft rotatably supported in the frame work, a worm wheel fixed to said shaft, a threaded member on the carriage of the machine engaging said worm wheel, a toothed feeder wheel and a toothed locking wheel rigidly connected to the worm wheel, a second toothed feeder wheel and toothed reversing wheel, rotatably mounted on said shaft, means for locking the locking wheel, levers pivotally mounted on the shaft, keys pivotally connected to the levers and engageable with the feeder wheels for rotating the shaft in opposite directions, a gear fixed on said shaft, and gears connecting the last mentioned gear to said reversing wheel.

4. In a calculating machine, a means for setting the slidable carriage which supports the indicating discs and etc. comprising means including a shaft for feeding the carriage step by step in opposite directions, locking means for locking the shaft after each movement, means for releasing said locking means, a disc fixed on the shaft and carrying indicia for indicating the position of the shaft, and a hand operated member fixed to the shaft for rotating the latter in opposite directions independently of said first mentioned means.

5. In a calculating machine as claimed in claim 1, said locking mechanism including a toothed wheel, a pivotally mounted lever having a roller adapted to enter the space between the teeth of the wheel, a spring for normally forcing the roller toward the wheel, and means for rocking said lever.

6. In a calculating machine, a means for setting the slidable carriage which supports the indicating disks etc. by means of a feeder mechanism which works step by step, including two members, one mounted on the framework of the machine and the other on the carriage, one of said members being provided with threads and the other with projections engaging said threads, one of said members being turnable and having its axis substantially parallel to the direction of movement of said carriage, means for actuating the turnable member in opposite directions, and locking mechanism cooperating with one of said members to lock the last mentioned member in positions corresponding to the working positions of the carriage.

7. In a calculating machine as claimed in claim 6, manually operated means for releasing the locking mechanism.

8. In a calculating machine as claimed in claim 6, auxiliary means for actuating the turnable member independently of the other means for turning said member.

9. In a calculating machine, a frame part, a carriage part slidably mounted on the frame part, a threaded member connected to one of said parts, a second member connected to the other part and having projections engaging the threads of the threaded member, one of said members being rotatable relatively to the other member, means for turning the rotatable member in opposite directions for moving the carriage step by step, and locking mechanism engaging one of said members for halting the movement of the carriage part after the latter has completed each step.

10. In a calculating machine as claimed in claim 9, manually operated means for releasing the locking mechanism, and auxiliary means for turning the rotatable member after the locking mechanism has been released.

11. In a calculating machine, a frame part, a carriage part slidably mounted on the frame part, a threaded member connected to one of said parts, a second member connected to the other part and having projections engaging the threads of the threaded member, one of said members being rotatable relatively to the other member, means including ratchet and pawl mechanism for turning the rotatable member in opposite directions to move the carriage part step by step, locking mechanism cooperating with the rotatable member for halting the movement of the carriage part after the latter has completed each step, means for releasing the locking mechanism, and auxiliary means for turning the rotatable member.

In witness whereof, I have hereunto signed my name.

VALENTIN JAKOB ODHNER.